UNITED STATES PATENT OFFICE.

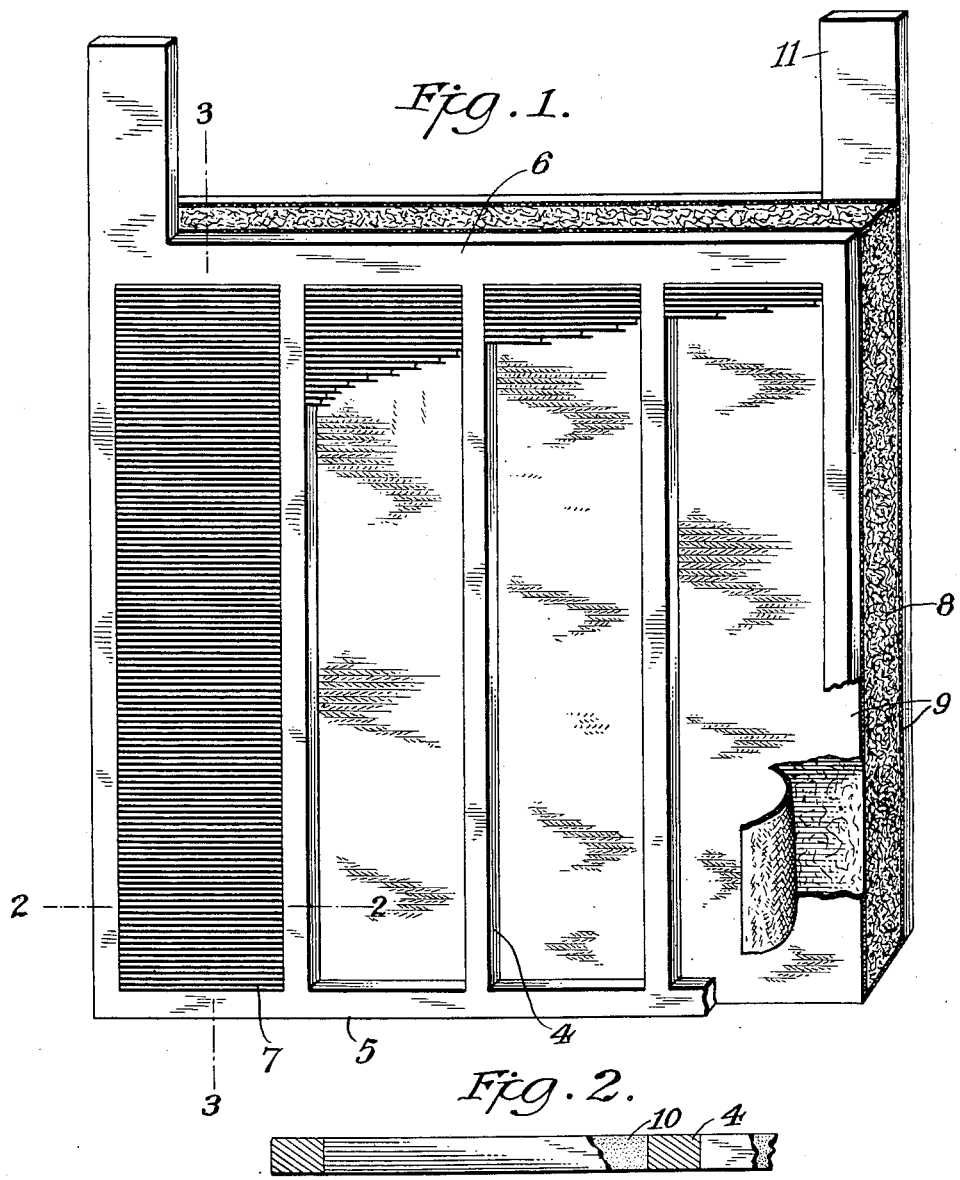

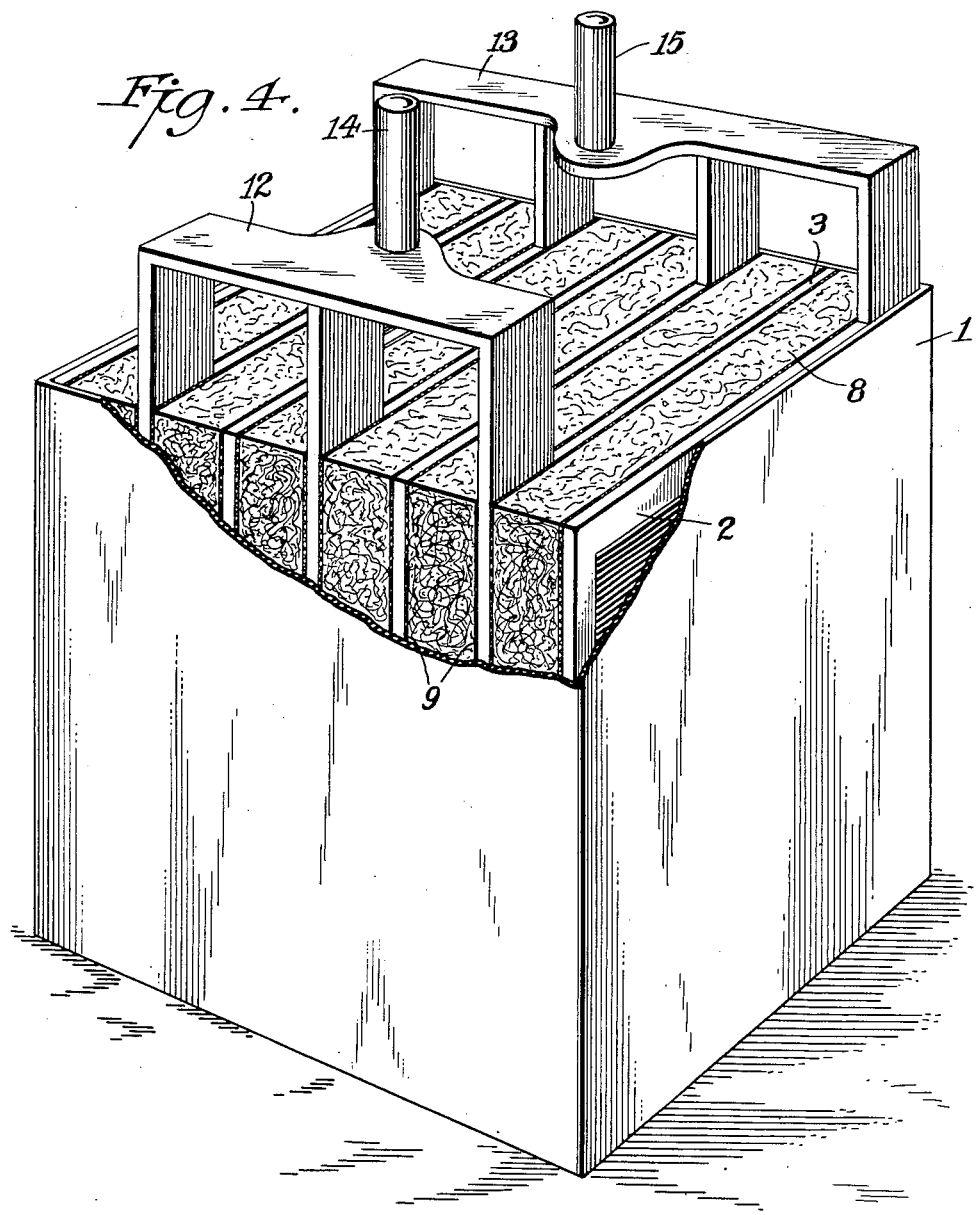

CHARLES S. PALMER, OF NEWTONVILLE, MASSACHUSETTS.

SECONDARY STORAGE BATTERY AND METHOD OF MAKING THE SAME.

1,251,412. Specification of Letters Patent. Patented Dec. 25, 1917.

Application filed July 23, 1915. Serial No. 41,474.

*To all whom it may concern:*

Be it known that I, CHARLES S. PALMER, a citizen of the United States, residing in Newtonville, county of Middlesex, and State of Massachusetts, have invented certain new and useful Improvements in Secondary Storage Batteries and Methods of Making the Same, of which the following is a specification.

This invention relates to improvements in secondary lead storage batteries generally, an example being batteries of the Planté and Faure types as well as those improved capacity batteries as hereinafter described containing exceptionally thin electrode plates.

The objects of the invention are the production of a highly efficient battery in which the electrolyte remains substantially constant in strength and action for prolonged periods of time owing to the auto-regeneration of the battery, and which battery is further equipped with very thin electrode plates which are spaced apart by durable separators. Said separators have a much longer life than wood when immersed in an acid electrolyte and insure more volume of contained liquor, good conductivity, and good circulation of the contained or entrained electrolyte and hence less smothering of the active material during the reaction thereof, together with a close binding of the active material with the consequent prevention of shedding of said material.

In my companion application No. 1770 filed January 2, 1915, and patented July 20, 1915, No. 1,147,261, for method of regenerating storage batteries, I have described a similar electrolyte for use in such process, and accordingly I make no claim to such process herein, this application being confined to the manufacture of lead storage batteries and the preservation of lead storage batteries however made by the aforesaid continuous auto-regeneration by means of my new electrolyte.

My invention is fully set forth and described in detail in the accompanying specification and drawings forming a part thereof, in which—

Figure 1 is an elevation, partly broken away, of a pair of electrodes of the battery, isolated;

Fig. 2 is a horizontal section along the lines 2—2 of Fig. 1;

Fig. 3 is a vertical fragmentary section along the lines 3—3 of Fig. 1, and

Fig. 4 is an elevation showing a complete cell with the exception of the cover, part of the side walls being broken away.

Referring to the drawings and the construction shown therein, the reference numeral 1 designates a battery cell which is adapted to receive a plurality of positive skeleton lead plates 2 and negative skeleton lead plates 3, a suitable size of plate being for example 6" long, 6" wide and 12/100" in thickness. Intermediate the ends of said plates are formed vertical lead ribs 5 which may be for example 3/16" x 3/8" in cross section, and may be spaced 1½" from each other and from the lateral ends of said electrode plates respectively. The top and bottom of each of said electrode plates consists of horizontal lead ribs 5 and 6 respectively, which may also for example be 1/8" thick with the lower rib 3/16" high, and the upper rib 5/16" high. The spaces intermediate the vertical rib are completely filled with a series of horizontal lead laminæ 7, each of which may be for example, 1/50" thick and 3/16" x 1½" in area and spaced from an adjacent lamina or from the top or bottom of said electrode plate, a distance of 1/25".

The adjacent positive and negative electrodes of the cell are separated from each other by animal felt separators 8, which may be for example, 5/16" thick, the said separator being provided with a fibrous covering 9 of silk, worsted or other suitable animal fiber fabric, which covering or jacket, as shown in Fig. 1, preferably extends across the bottom and over each of the sides of said separator, leaving the ends and top uncovered. The space between adjacent laminæ are completely filled with an active material 10, as hereinafter more fully described. Each of said electrodes is provided with a pole piece 11, the positive poles being connected to a pole plate 12 and the negative poles to a pole plate 13, and upon said pole plates are mounted a positive terminal 14 and a negative terminal 15 respectively, to which terminals the wires of the desired circuit are secured by suitable binding posts (not shown) in the well known manner.

The cell is completely filled with an electrolyte consisting of a concentrated acidified solution of sodium bi-sulfate, the amount of uncombined acid therein contained, which is preferably sulfuric, being sufficient to prevent efflorescence, and the said electrode is preferably of a specific gravity approximately 1.2.

In the production of a battery in accordance with my invention I preferably proceed as follows:

The usual paste consisting of a mixture preferably of lead oxids and lead sulfate, is placed upon grids which contain laminated shelves of a large superficial area, and approximately 1/50" thick, said paste being applied in layers to a thickness of 1/25" upon said shelves, these shelves being contained on a plate not exceeding 1/8" thick, preferably. The plate is then immersed in the electrolyte which serves to react upon the active material on the electrodes and converting the material of the negative electrode into a spongy paste and the material of the positive electrode into a dense paste both being highly sticky, active and permeable.

The aforesaid sticky, active, permeable and coherent material is essentially different from the ordinary hard, baked paste used on the grids of the ordinary lead battery in which the thickness of the so-called active material of the battery is several times that employed by me as herein described. The space between the shelves in my battery is so small that the material is conveniently held on said shelves by reason of the well known physical law of the cohesion or adhesion of layers of minute thickness to the surfaces carrying the same, whereas in the ordinary battery owing to the thickness of the paste which is applied, not only is it necessary to provide means for holding the same upon the shelves by the common practice of hardening, or baking, but this results in a greater part of the material cleaving or scaling off, thereby becoming highly inactive and only a small portion of it being in a condition of activity.

The aforesaid improved electrolyte insures the practical insolubility of the active material of the electrodes when the circuit is open, (i. e. when the battery is out of commission), together with a strong solvent-, reducing- and oxidizing-action in the alternate charge and discharge of the battery. By the use of the aforesaid electrolyte I obtain a battery of extraordinarily high capacity, (largely in excess of the ordinary sulfuric acid lead battery) and high efficiency together with one having an unusually long life, due to the protective action aforesaid of the electrolyte upon the active material on the grids and with large active surface.

Inasmuch as my improved battery is considerably higher in capacity, it is necessary to provide for a greater volume of electrolyte. In view of the improved and lengthened life of the battery, I have devised a new separator which is more durable than the ordinary wood separators whether the same be treated or untreated, as carbonization of the wood separators soon occurs, with the result that the life of the same is seldom more than a year. In these respects, also my battery differs from the old forms of batteries containing the old electrolyte.

As is evident from the foregoing the periodic charging and discharging of my improved battery effects an auto-regeneration of the plates which have a natural sulfating tendency but which, by this means, are continually being auto-regenerated in the manner described in my aforesaid companion application.

In many cases I prefer to make the positive plates a trifle thicker than the negative, for example, the positive may be 1/8" and the negative 1/12".

The thin laminæ or grid shelves, as previously described, are of relatively large superficial area, which makes them adaptable for supporting relatively large amounts of active material, thus materially increasing the efficiency of the battery while maintaining the weight of the same at a minimum.

Obviously, many other minor changes may be made in the construction of said battery, such for example as the omission of the cover of said separator, variation in the dimensions of the parts of the battery and concentration of the electrolyte from that herein given, and other similar modifications, all without departing from the spirit of my invention, as set forth in the accompanying claims.

Having thus described my invention, what I claim and desire to secure by Letters Patent is:—

1. A lead storage battery having an electrolyte consisting essentially of a concentrated solution of an acidified alkali-metal bi-sulfate of a specific gravity in excess of 1.1.

2. In a lead storage battery, an electrolyte consisting of a concentrated solution of an acidified alkali-metal bi-sulfate of a specific gravity in excess of 1.1.

3. A lead storage battery having an electrolyte consisting essentially of a concentrated solution of an alkali-metal bi-sulfate of a specific gravity in excess of 1.1 containing approximately 4% to 8% of additional sulfuric acid.

4. In a lead storage battery, an electrolyte consisting essentially of a concentrated solution of acidified sodium bi-sulfate of a specific gravity in excess of 1.1, a grid comprising metallic lead supporting plates approximately 12/100" in thickness, with laminations comprising lead shelves approximately 1/50" in thickness, said shelves being spaced apart approximately 1/25", and active material filling the spaces between said shelves.

5. The method of making an auto-regenerative lead storage battery, which consists in placing active material, containing the "PbO" radical within a plurality of electrodes, immersing the same in an electrolyte consisting essentially of a concentrated solution of acidified sodium bi-sulfate of a specific gravity in excess of 1.1 and subjecting the said active material moistened with said electrolyte to the alternately charging and discharging action of an electric current.

6. In a secondary battery, the combination comprising an electrolyte consisting of a concentrated acidified solution of an alkali metal bi-sulfate of a specific gravity in excess of 1.1, and a plurality of electrodes, each electrode being provided with a plurality of thin grid-shelves of relatively large superficial area adapted to support relatively large amounts of active material thereon.

In witness whereof, I have hereunto set my hand at the city of Newton, county of Middlesex, and State of Massachusetts, this 21st day of July, 1915.

CHARLES S. PALMER.